(12) United States Patent
Swope (10) Patent No.: US 7,380,146 B2
(45) Date of Patent: May 27, 2008

(54) POWER MANAGEMENT SYSTEM

(75) Inventor: John Malvern Swope, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 11/112,120

(22) Filed: Apr. 22, 2005

(65) Prior Publication Data

US 2006/0242435 A1   Oct. 26, 2006

(51) Int. Cl.
*G06F 1/26* (2006.01)
(52) U.S. Cl. .................. 713/320; 713/300; 713/324; 713/330; 713/340
(58) Field of Classification Search ............. 713/300, 713/320, 340, 324, 330
See application file for complete search history.

(56) References Cited

U.S. PATENT DOCUMENTS

| | | | |
|---|---|---|---|
| 3,555,290 A * | 1/1971 | Ellermeyer | 307/65 |
| 4,460,951 A | 7/1984 | Fenter et al. | |
| 5,748,033 A * | 5/1998 | Kaveh et al. | 327/545 |
| 5,787,014 A | 7/1998 | Hall et al. | |
| 6,065,124 A | 5/2000 | Lee | |
| 6,367,021 B1 | 4/2002 | Shay | |
| 6,608,402 B2 * | 8/2003 | Soo et al. | 307/52 |
| 2004/0104714 A1 | 6/2004 | Nishimaki | |
| 2004/0151304 A1 * | 8/2004 | George et al. | 379/413 |
| 2004/0217653 A1 * | 11/2004 | Neidorff | 307/80 |
| 2005/0028017 A1 * | 2/2005 | Janakiraman et al. | 713/340 |

FOREIGN PATENT DOCUMENTS

| EP | 0335316 | 5/1995 |
|---|---|---|
| EP | 1519473 | 9/2004 |

* cited by examiner

*Primary Examiner*—Thomas Lee
*Assistant Examiner*—Malcolm D Cribbs (57) ABSTRACT

A power management system includes a voltage source configured to provide at least a first voltage and a second voltage, and a controller configured to couple the first voltage to a first voltage supply terminal or couple the second voltage to a second voltage supply terminal in response to a comparison of one or more first variables associated with the first voltage supply terminal to one or more second variables associated with the second voltage supply terminal.

38 Claims, 4 Drawing Sheets

POWER MANAGEMENT SYSTEM

BACKGROUND

Electronic systems such as computer systems often use electrical components that operate at different power supply voltage levels. The computer systems are designed to meet industry standards that include standards for bus systems which interconnect the components. One such standard bus system is the peripheral component interconnect (PCI) bus system. The PCI bus system is a high performance bus system which is used to interconnect integrated circuits, printed circuit boards and processor or memory subsystems within a computer. Industry standards are employed for bus systems because they define common form factors, power and voltage requirements and interconnect configurations that enable multiple manufacturers to manufacture components that can connect to the bus system. Computer systems usually include a common backplane that includes slots which provide PCI bus access to printed circuit cards or PCI cards that are inserted into the slots. In accordance with the PCI standards, the slots can accept PCI cards that operate at one of two or more voltage levels and meet maximum power usage requirements.

To meet these power and voltage requirements, many computer systems include power supply systems having distributed power architectures. With distributed architectures, a common AC to DC power supply is used to generate intermediate voltages, and additional DC to DC voltage converters are used to generate final voltages. With the PCI bus, the AC to DC power supply can be used to generate intermediate voltages such as 48 volts or 12 volts, and subsequent DC to DC voltage converters can be used to generate signaling voltages, such as 3.3 volts or 5 volts.

Power supply systems have also used multiple tap transformers to meet the power and voltage requirements. Multiple tap transformers include a number of taps which can provide the needed voltage levels.

One problem is that the maximum power usage is defined for each PCI card, but the specific supply voltage level from which power may be consumed is not. As a result, power supply systems are typically designed to supply the maximum power requirement for each of the final voltage levels which are provided. For an example PCI bus system that can use PCI cards that operate at 3.3 volts or 5 volts, the DC to DC converter providing the 3.3 volts and the DC to DC converter supplying the 5 volts are each able to provide sufficient power for all of the slots in the computer system in case all of the PCI cards are operating at 3.3 volts or at 5 volts.

This unused power supply capacity typically increases manufacturing costs. If power redundancy is employed, the manufacturing costs are further increased, because the redundant power supply system is able to provide twice the amount of power at each signaling voltage level. With large computer systems that include many slots, these manufacturing costs can become substantial.

SUMMARY

One aspect of the present invention provides a power management system. The power management system includes a voltage source configured to provide at least a first voltage and a second voltage, and a controller configured to couple the first voltage to a first voltage supply terminal or couple the second voltage to a second voltage supply terminal in response to a comparison of one or more first variables associated with the first voltage supply terminal to one or more second variables associated with the second voltage supply terminal.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
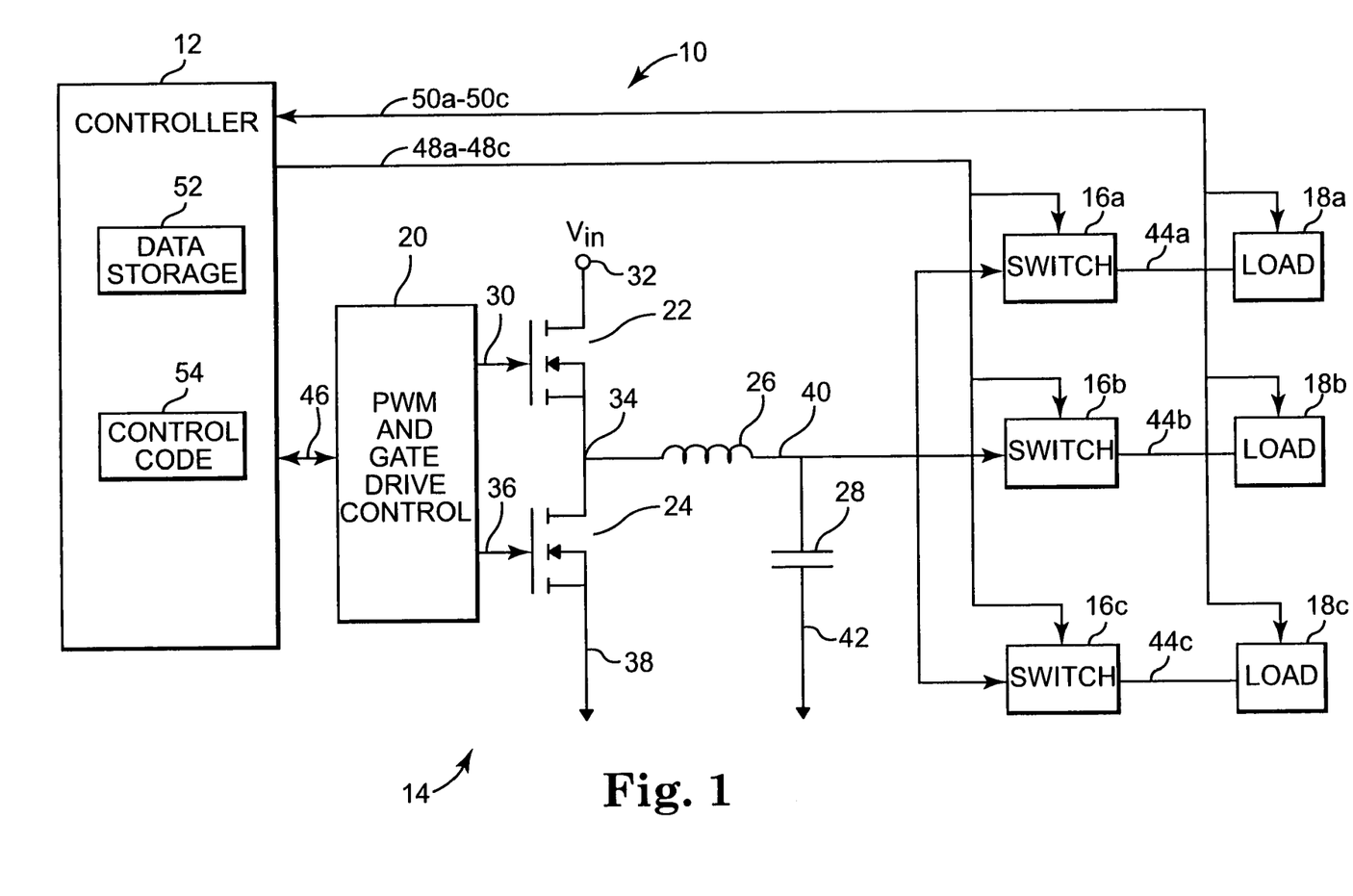
FIG. 1 is a block diagram illustrating one embodiment of a power management system.

FIG. 1 is a block diagram illustrating one embodiment of a power management system 10. Power management system 10 includes a controller 12, a voltage source 14, and switches 16a-16c. Switches 16a-16c are coupled between loads 18a-18c and the output of voltage source 14 which is output terminal 40. Switches 16a-16c selectively couple output terminal 40 to one of the loads 18a-18c. In one embodiment, switches 16a-16c are metal oxide semiconductor field effect transistors (MOSFETs). In other embodiments, switches 16a-16c are implemented with other suitable power transistors. In the illustrated embodiment, voltage source 14 is capable of providing three different output voltages which are Va, Vb and Vc. In other embodiments, any suitable number of output voltages can be provided by voltage source 14. In one embodiment, there are three voltage sources 14 and each voltage source 14 provides one output voltage which is one of Va, Vb or Vc.

In the embodiment illustrated in FIG. 1, voltage source 14 is a DC-DC converter which converts an input DC voltage to a lower output DC voltage. In other embodiments, suitable voltages sources include AC-DC converters which convert an input AC voltage to an output DC voltage. In the illustrated embodiment, voltage source 14 includes pulse width modulation (PWM) and gate drive controller 20, metal oxide semiconductor field effect transistor (MOSFET) switches 22 and 24, inductor 26 and capacitor 28. While voltage source 14 is illustrated as a single phase step down or buck converter, in other embodiments other suitable types of voltage sources or power supplies can be used, such as multi-phase buck converters, step up or boost converters or input to output voltage inverters.

In the illustrated embodiment, MOSFET 22 has a gate coupled through path 30 to an output of controller 20, a drain coupled to an input voltage Vin at terminal 32, and a source connected to a drain of MOSFET 24 through path 34. MOSFET 24 has a gate coupled to an output of controller 20 through path 36 and has a source coupled to ground through path 38. MOSFETs 22 and 24 are coupled to inductor 26 through path 34. Inductor 26 is coupled through path 40 to a first terminal of capacitor 28. Capacitor 28 is coupled through a second terminal at 42 to ground. Path 40 is the output terminal of voltage source 14. Controller 20 provides a PWM and gate drive signal to MOSFETs 22 and 24 through paths 30 and 36 to alternatively turn on and turn off MOSFETs 22 and 24. This effectively transfers energy from Vin at terminal 32 to output terminal 40, and with proper control of the on and off times for MOSFETs 22 and 24, the desired output voltage of Va, Vb or Vc can be maintained at output terminal 40.

In the illustrated embodiment, controller 20 uses pulse width modulation to control MOSFETs 22 and 24. With pulse width modulation, the switching frequency is constant and the duty cycle for the on and off times for MOSFETs 22 and 24 varies in accordance with the voltage required at output terminal 40. In operation, MOSFET 22 is switched on by controller 20 while MOSFET 24 remains off. This effectively couples inductor 26 to Vin at terminal 32. Because Vin is greater in value than the desired output voltage at output terminal 40, there is a net positive voltage drop across inductor 26 which causes current to begin increasing through inductor 26 and charge capacitor 28. At the appropriate time, MOSFET 22 is switched off and MOSFET 24 is switched on by controller 20, resulting is a net negative voltage across inductor 26. Because the current through inductor 26 cannot change instantly, current sourced through MOSFET 24 charges capacitor 28 and causes the voltage at output terminal 40 to increase. MOSFETs 22 and 24 can be suitably switched using this approach until the output voltage at output terminal 40 reaches a desired value. By continually switching MOSFETs 22 and 24 so that inductor 26 provides a sufficient amount of current to meet the output current requirement at output terminal 40, the voltage across capacitor 28 can be maintained at the desired voltage value.

In the illustrated embodiment, controller 20 is capable of generating three different switching duty cycles for the on and off times of MOSFETs 22 and 24 in order to maintain Va, Vb or Vc at output terminal 40. In other embodiments, controller 20 can generate other suitable numbers of switching duty cycles. In the illustrated embodiment, one of the voltages Va, Vb or Vc can be provided to one of the loads 18a-18c by selecting the appropriate duty cycle and by activating one of switches 16a-16c. Switches 16a-16c selectively couple either Va, Vb or Vc at output terminal 40 to one of loads 18a-18c through paths 44a-44c which are voltage supply terminals for the loads 18. In this embodiment, all switches 16 are turned off before any one of switches 16a-16c are turned on in order to avoid shorting any of voltage supply terminals 44a-44c together. This is because one or more of the loads 18a-18c may be coupled to other voltage sources (not shown) through voltage supply terminals 44a-44c. In one embodiment, switches 16a-16c are MOSFETs.

In the illustrated embodiment, controller 12 is coupled to controller 20 through path 46 and to switches 16a-16c through paths 48a-48c respectively. To provide one of the output voltages Va, Vb or Vc to a corresponding one of the loads 18a-18c, controller 12 sends a switching duty cycle signal to controller 20. Controller 20 provides gate bias signals to MOSFETS 22 and 24 through paths 30 and 36, respectively, according to one of three switching duty cycles so that the selected output voltage value (either Va, Vb or Vc) can be maintained at output terminal 40. Controller 12 also selects and activates one of the switches 16a-16c in order to couple output terminal 40 to one of the loads 18a-18c which corresponds to the selected output voltage value.

In one embodiment, power management system 10 is providing power to a computer system. In various embodiments, loads 18a-18c can include a central processing unit (CPU), memory subsystems, and peripheral components, such as video display adapters, small computer system interface (SCSI) controllers, disk drives, and network interface cards (NICs). In one embodiment, each one of the loads 18a-18c uses a unique output voltage value. In another embodiment, two or more of the loads 18a-18c use the same output voltage value.

In one embodiment, power management system 10 is providing power to a computer system which includes output loads 18a and 18b. In this embodiment, the output loads 18 are compliant with the PCI bus system specification, and load 18a operates at 3.3 volts and load 18b operates at 5.0 volts. Controller 12 determines if 3.3 volts should be coupled to load 18a or if 5.0 volts should be coupled to load 18b. To couple 3.3 volts to load 18a, controller 12 sends a switching duty cycle signal to controller 20 which corresponds to 3.3 volts, and controller 20 provides gate bias signals to MOSFETS 22 and 24 through paths 30 and 36, respectively, which are sufficient to maintain 3.3 volts at output terminal 40. Controller 12 also activates or closes switch 16a and ensures that switch 16b is deactivated or open in order to couple output terminal 40 to load 18a. To couple 5.0 volts to load 18b, controller 12 sends a switching duty cycle signal to controller 20 which corresponds to 5.0 volts, and controller 20 provides gate bias signals to MOSFETS 22 and 24 through paths 30 and 36, respectively, which are sufficient to maintain 5.0 volts at output terminal 40. Controller 12 also activates or closes switch 16b and ensures that switch 16a is deactivated or open in order to couple output terminal 40 to load 18b.

In the illustrated embodiment, controller 12 couples one of Va, Vb or Vc to one of the corresponding loads 18a-18c in response to a comparison of one or more variables associated with each one of the voltage supply terminals 44a-44c. In this embodiment, controller 12 compares currents Ia, Ib and Ic which respectively are currents conducted by voltage supply terminals 44a, 44b and 44c. In various embodiments, loads 18a-18c each can be coupled to additional power sources which provide the supply voltages Va, Vb or Vc to voltage supply terminals 44a, 44b and 44c, respectively. In the illustrated embodiment, currents Ia, Ib and Ic are the total current consumed by the respective loads 18a, 18b and 18c. Based on the comparison of currents Ia, Ib and Ic, controller 12 couples one of the voltages Va, Vb or Vc at output terminal 40 to the corresponding one of the loads 18a, 18b or 18c. In this embodiment, coupling one of the voltages Va, Vb or Vc to the corresponding load 18a, 18b or 18c provides additional current capacity to the load 18 which has the highest current draw (e.g. the highest value of Ia, Ib or Ic).

In one embodiment, one of the one or more variables associated with each of the voltage supply terminals 44a-44c is a power amount consumed by each of the corresponding loads 18a, 18b or 18c. In this embodiment, controller 12 compares power amounts Pa, Pb and Pc, which respectively are the power consumed by each of the loads 18a, 18b and 18c. In one embodiment, loads 18a, 18b and 18c are each coupled to additional power sources (not shown) which provide the supply voltages Va, Vb and Vc to the voltage supply terminals 44a, 44b and 44c, respectively. In the illustrated embodiment, based on the comparison of power amounts Pa, Pb and Pc, controller 12 couples one of the voltages Va, Vb or Vc at output terminal 40 to the corresponding one of the loads 18a, 18b or 18c. In this embodiment, coupling one of the voltages Va, Vb or Vc to the corresponding one of the loads 18a, 18b or 18c provides additional power capacity to the corresponding load 18. In one embodiment, controller 12 provides additional power capacity to the load 18 which has the greatest need, as exemplified by the highest level of power consumption (e.g. the highest value of Pa, Pb and Pc).

In one embodiment, loads 18a, 18b or 18c each comprise multiple loads and one of the one or more variables associates with each of the voltage supply terminals 44a-44c is a number of the multiple loads coupled to each of the voltage supply terminals 44a, 44b or 44c. In this embodiment, controller 12 compares the number of loads coupled to each of the voltage supply terminals 44a, 44b and 44c, and based on the comparison, couples one of the voltages Va, Vb or Vc to the corresponding one of the loads 18a, 18b or 18c. In one embodiment, the maximum power required by each one of the multiple loads is known, and controller 12 provides additional power capacity to the corresponding load 18a, 18b or 18c which has the greatest need, as exemplified by the greatest number of multiple loads. In one embodiment, loads 18 are compliant with an industry standard which specifies the maximum amount of power which can be consumed by each one of the multiple loads. In one embodiment, this standard is the PCI bus specification.

In the illustrated embodiment, controller 12 is coupled to loads 18a-18c by paths 50a-50c, respectively. In this embodiment, controller 12 is configured to receive data from each of the loads 18, wherein the data includes values of the variables associated with voltage supply terminals 44a-44c. In one embodiment, the variables are currents conducted by voltage supply terminals 44a-44c into loads 18a-18c. In one embodiment, these currents are the maximum currents conducted by voltage supply terminals 44a-44c. In this embodiment, controller 12 is configured to receive the current values for voltage supply terminals 44a-44c on paths 50a-50c. Controller 12 compares these currents and enables controller 20 to provide one of the voltages Va, Vb or Vc to the load 18a-18c which has the highest current. If the current used by load 18a is greater than the currents used by loads 18b and 18c, then controller 12 couples voltage value Va to load 18a. If the current used by load 18b is greater than the currents used by loads 18a and 18c, then controller 12 couples voltage value Vb to load 18b. If the current used by load 18c is greater than the currents used by loads 18a and 18b, then controller 12 couples voltage value Vc to load 18c.

In one embodiment, there is no feedback path between loads 18a-18c through paths 50a-50c. In this embodiment, other voltage sources are providing the voltages Va, Vb and Vc to loads 18a-18c, and controller 12 is configured to receive the variables which are currents conducted by voltage supply terminals 44a-44c into loads 18a-18c from these other voltage sources. In one embodiment, these voltage sources are DC to DC converters. In one embodiment, the one or more variables associated with each of the voltage supply terminals 44a-44c are power amounts Pa, Pb and Pc, which respectively are the power consumed by each of the loads 18a, 18b and 18c. In one embodiment, loads 18a, 18b or 18c each comprise multiple loads, and the one or more variables associates with each of the voltage supply terminals 44a-44c are a number of the multiple loads coupled to each of the voltage supply terminals 44a, 44b or 44c.

In one embodiment, controller 12 includes one or more data storage locations 52 which are configured to store one or more of the variables associated with each of the voltage supply terminals 44a-44c. In various embodiments, the variables can be stored in data storage locations 52 at suitable times which include either periodically or as needed. In this embodiment, controller 12 reads the variables to be compared from data storage locations 52.

In one embodiment, controller 12 includes computer readable program code. In one embodiment, this program code is stored in any suitable location, including within controller 12, voltage source 14, loads 18, or within a computer system which is coupled to power management system 10. In one embodiment, this program code is stored as firmware. In the illustrated embodiment, the computer readable program code is illustrated as control code 54. Control code 54 includes a first computer readable program code configured to cause controller 12 to compare one or more variables associated with each of the voltage supply terminals 44a-44c. Control code 54 includes a second computer readable program code configured to cause controller 12 to couple one of Va, Vb or Vc to one of the corresponding loads 18a-18c in response to the comparison of one or more of the variables associated with each of the voltage supply terminals 44a-44c.

Figure 2:
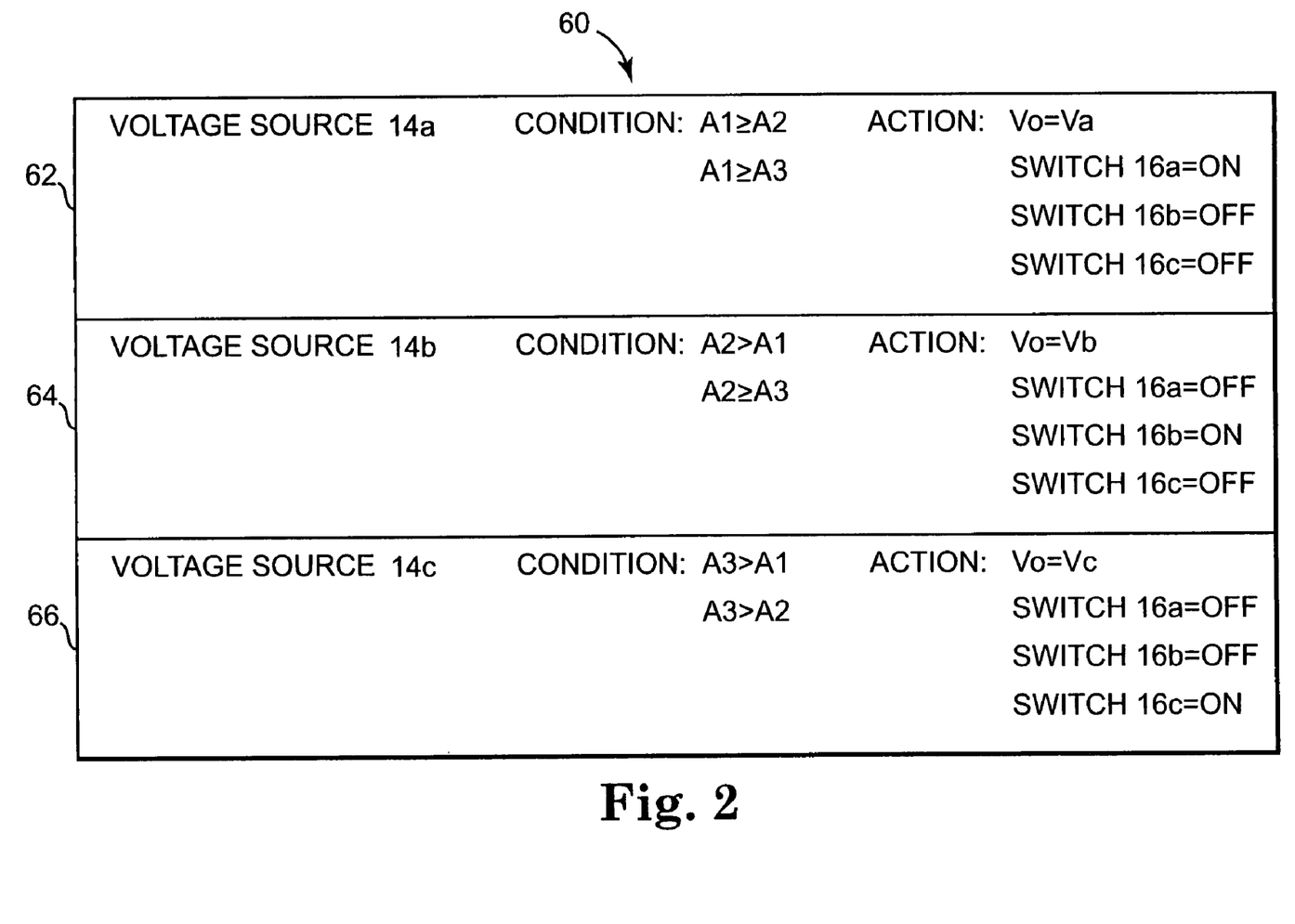
FIG. 2 is a diagram illustrating one embodiment of switching rules for a power management system.

FIG. 2 is a diagram illustrating one embodiment of switching rules for controller 12. The switching rules are illustrated at 60. Conditions and actions for three voltage sources 14a, 14b and 14c are illustrated, respectively, at 62, 64 and 66. For each voltage source 14, a condition and an action to be taken by controller 12 are indicated. While three voltage sources 14 are illustrated, in other embodiments, any suitable number of voltage sources 14 or loads 18 can be used. In one embodiment, each voltage source 14 includes a controller 12 which compares variables A1, A2 and A3. In one embodiment, one controller 12 compares variables A1, A2 and A3 for all of the voltage sources 14. In the illustrated embodiment, controller 12 compares the variables A1, A2 and A3 to each other in an order. In various embodiments, variables A1, A2 and A3 can represent currents conducted by respective voltage supply terminals 44a-44c, power consumed by respective loads 18a-18c, or a number of multiple loads coupled to each of the voltage supply terminals 44a-44c. In other embodiments, variables A1, A2 and A3 represent other suitable variables or attributes related to voltage supply terminals 44a-44c or loads 18a-18c.

In the illustrated embodiment, controller 12 compares variables A1, A2 and A3 in an order. That is, controller 12 first compares variable A1 to variables A2 and A3, next compares variable A2 to variables A1 and A3, and next compares variable A3 to variables A1 and A2. Once each comparison is made, controller 12 couples one of Va, Vb or Vc to one of the corresponding loads 18a-18c in response to the comparison.

At 62, the condition for the variable comparison for voltage source 14a is that A1 must be greater than or equal to A2 and A1 must be greater than or equal to A3. If this condition is met, controller 12 sends a switching duty cycle signal to controller 20a that enables voltage source 14a to provide voltage Va at output terminal 40a, and controller 12 activates switch 16a and ensures that switches 16b and 16c are deactivated, in order to couple voltage Va at output terminal 40a to load 18a.

At 64, the condition for the variable comparison for voltage source 14b is that A2 must be greater than A1 and A2 must be greater than or equal to A3. If this condition is met, controller 12 sends a switching duty cycle signal to controller 20*b* that enables voltage source 14*b* to provide voltage Vb at output terminal 40*b*, and controller 12 also activates switch 16*b* and ensures that switches 16*a* and 16*c* are deactivated, in order to couple voltage Vb at output terminal 40*b* to load 18*b*.

At 66, the condition for the variable comparison for voltage source 14*c* is that A3 must be greater than A1 and A3 must be greater than A2. If this condition is met, controller 12 sends a switching duty cycle signal to controller 20*c* that enables voltage source 14*c* to provide voltage Vc at output terminal 40*c*, and controller 12 also activates switch 16*c* and ensures that switches 16*a* and 16*b* are deactivated, in order to couple voltage Vc at output terminal 40*c* to load 18*c*.

In the illustrated embodiment, for each comparison, the value of each variable A must be greater than lower ordered variables A and greater than or equal to higher ordered variables A in order for controller 12 to provide the voltage Va, Vb or Vc to the load 18*a*, 18*b* or 18*c*. In one embodiment, for each comparison, the value of each variable A must be greater than or equal to lower ordered variables A and greater than higher ordered variables A in order for controller 12 to provide the voltage Va, Vb or Vc to the load 18*a*, 18*b* or 18*c*. In other embodiments, other suitable comparison conditions can be used.

Figure 3:
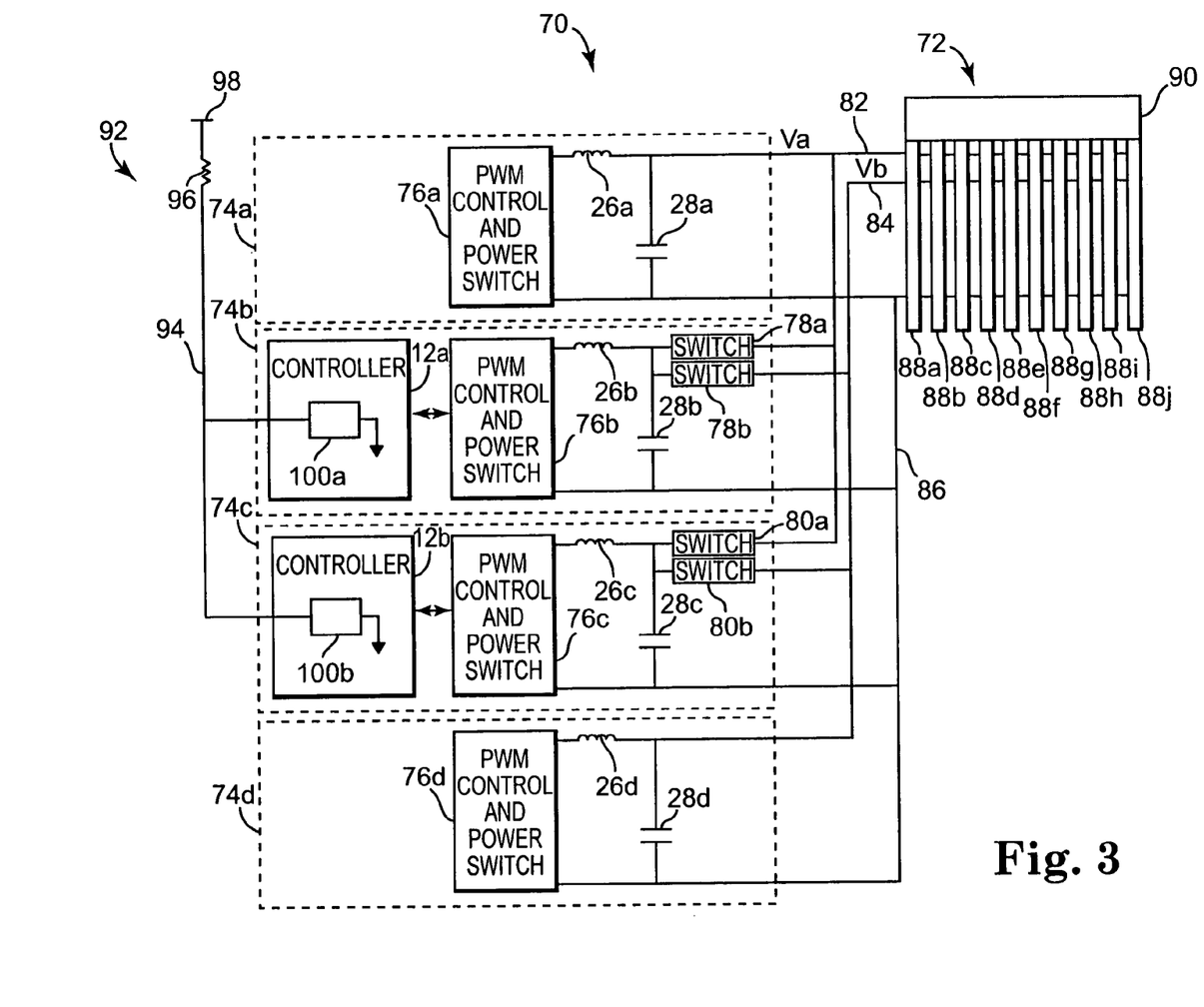
FIG. 3 is a block diagram illustrating one embodiment of a power management system.

FIG. 3 is a block diagram illustrating one embodiment of a power management system 70 for use with a computer system 72. The power management system 70 includes a DC to DC converter 74*a* which provides a voltage Va to a voltage rail 82 within the computer system 72. DC to DC converter 74*b* and 74*c* are each configured to provide either voltage Va to voltage rail 82 or voltage Vb to voltage rail 84. DC to DC converter 74*d* is configured to provide a voltage Vb to a voltage rail 84 within the computer system 72. Voltage rails 82 and 84 are coupled to PCI slots 88*a*-88*j*. DC to DC converters 74*a*-74*d* each include a ground connection 86 which is coupled to PCI slots 88*a*-88*j*. In this embodiment, computer system 72 is compliant with the PCI bus specification. In other embodiments, computer system 72 is compliant with other bus specifications. In the illustrated embodiment, PCI slots 88*a*-88*j* are coupled to PCI backplane 90. PCI backplane 90 couples to other suitable components within computer system 72 which include, but are not limited to, one or more CPUs or memory subsystems. In other embodiments, any suitable number of DC to DC converters 74 can be used. In other embodiments, DC to DC converters 74 are configured to provide any suitable number of output voltages V. In other embodiments, any suitable number of voltage rails are included within computer system 72.

In the illustrated embodiment, each PWM control and power switch 76*a*-76*d* includes a controller 20 and MOSFETs 22 and 24. DC to DC converters 74*a* and 74*d* do not include controller 12 as they each only provide one output voltage (Va or Vb, respectively). PWM control and power switch 76*b* and 76*c* each are able to provide two output voltages, and as such, are controlled by controllers 12*a* and 12*b*, respectively.

In the illustrated embodiment, DC to DC converters 74*b* and 74*c* do not switch or provide the voltages Va or Vb to voltage rails 82 or 84 at the same time. In other embodiments, DC to DC converters 74*b* and 74*c* switch or provide the voltages Va or Vb to voltage rails 82 or 84 at suitable times, including at the same time.

In the illustrated embodiment, controller 12*a* and 12*b* are each coupled to a status circuit 92 which can be asserted (switched from at least a first state to at least a second state) during a time that controller 12*a* or controller 12*b* is switching voltage Va to voltage rail 82 or voltage Vb to voltage rail 84. In the illustrated embodiment, when status circuit 92 is in a first state, neither controller 12*a* or controller 12*b* are switching voltage Va to voltage rail 82 or voltage Vb to voltage rail 84. When status circuit 92 is in a second state, controller 12*a* or controller 12*b* is switching voltage Va to voltage rail 82 or voltage Vb to voltage rail 84.

In the illustrated embodiment, status circuit 92 includes a bus 94 which is coupled to a supply voltage at 98 through a pull-up resistor 96. Bus 94 is at a high voltage level if controllers 12*a* and 12*b* are not asserting bus 94. Bus 94 is at a low voltage level if controller 12*a* or controller 12*b* is asserting (pulling down) bus 94. In the illustrated embodiment, status circuit 92 includes pull-down circuit 100*a* within controller 12*a* and pull-down circuit 100*b* within controller 12*b*. Pull-down circuits 100*a* and 100*b* are each coupled between ground 86 and buss 94. Pull-down circuit 100*a* provides a high impedance between bus 94 and ground 86 when controller 12*a* is not asserting bus 94, and pull-down circuit 100*b* provides a high impedance between bus 94 and ground 86 when controller 12*b* is not asserting bus 94. Pull-down circuit 100*a* provides a low impedance between bus 94 and ground 86 when controller 12*a* is asserting bus 94, and pull-down circuit 100*b* provides a low impedance between bus 94 and ground 86 when controller 12*b* is asserting bus 94. If both pull-down circuits 100*a* and 100*b* are providing a high impedance between bus 94 and ground 86, bus 94 is at the high voltage level which is equal to the supply voltage at 98. If either pull-down circuit 100*a* or 100*b* is providing a low impedance between bus 94 and ground 86, bus 94 is at the low voltage level which is equal to ground. In one embodiment, controller 12*a* and controller 12*b* each wait until bus 94 is at the high voltage level before asserting bus 94. In one embodiment, bus 94 is at the low voltage level if controller 12*a* and controller 12*b* are not asserting bus 94, and bus 94 is at the high voltage level if either controller 12*a* or 12*b* is asserting (pulling up) bus 94.

In other embodiments, other suitable approaches can by used by controllers 12 to provide an indication when the DC to DC converters 74*b*-74*c* are switching the output voltages Va or Vb to voltage rails 82 or 84. In one embodiment, one or more bits are stored in data storage locations 52. The one or more bits can be read by other controllers 12 and provide an indication that a corresponding controller 12 is switching output voltages.

In the illustrated embodiment, 10 PCI slots 88*a*-88*j* are used. In other embodiments, any suitable number of PCI slots can be used. In the illustrated embodiment, the voltage Va is equal to 5.0 volts, and the voltage Vb is equal to 3.3 volts. Each of the 10 PCI slots illustrated accepts printed circuit boards (PCI cards) which have a PCI standard form factor. In the illustrated embodiment, each card dissipates a maximum of 25 watts and operates from either a 3.3 volt or 5.0 volt power supply voltage. In other embodiments, the printed circuit cards follow other suitable bus standards. In the present embodiment, the 10 PCI slots 88*a*-88*j* accept up to 10 PCI cards. Because the PCI cards can operate at either 3.3 volts or 5.0 volts, a maximum of 250 watts can be dissipated at 3.3 volts, and a maximum of 250 watts can be dissipated 5.0 volts.

In the illustrated embodiment, DC to DC converters 74*a*-74*d* can source a total of 352 watts and can provide both 3.3 volts and 5.0 volts to the PCI slots 88*a*-88*j*. Each DC to DC converter is capable of providing up to 88 watts of power. If all 10 PCI slots 88*a*-88*j* are operating at 3.3 volts and are dissipating 250 watts in total, DC to DC converters 74a-74d can provide up to 352 watts at 3.3 volts. If all 10 PCI slots 88a-88j are operating at 5.0 volts and are dissipating 250 watts in total, DC to DC converters 74a-74d can provide up to 352 watts at 5.0 volts. If some PCI slots 88a-88j are operating at 3.3 volts and some PCI slots 88a-88j are operating at 5.0 volts, DC to DC converters 74a-74d can be configured to provide 3.3 volts and 5.0 volts of power with each of the 10 PCI cards dissipating 25 watts.

Figure 4:
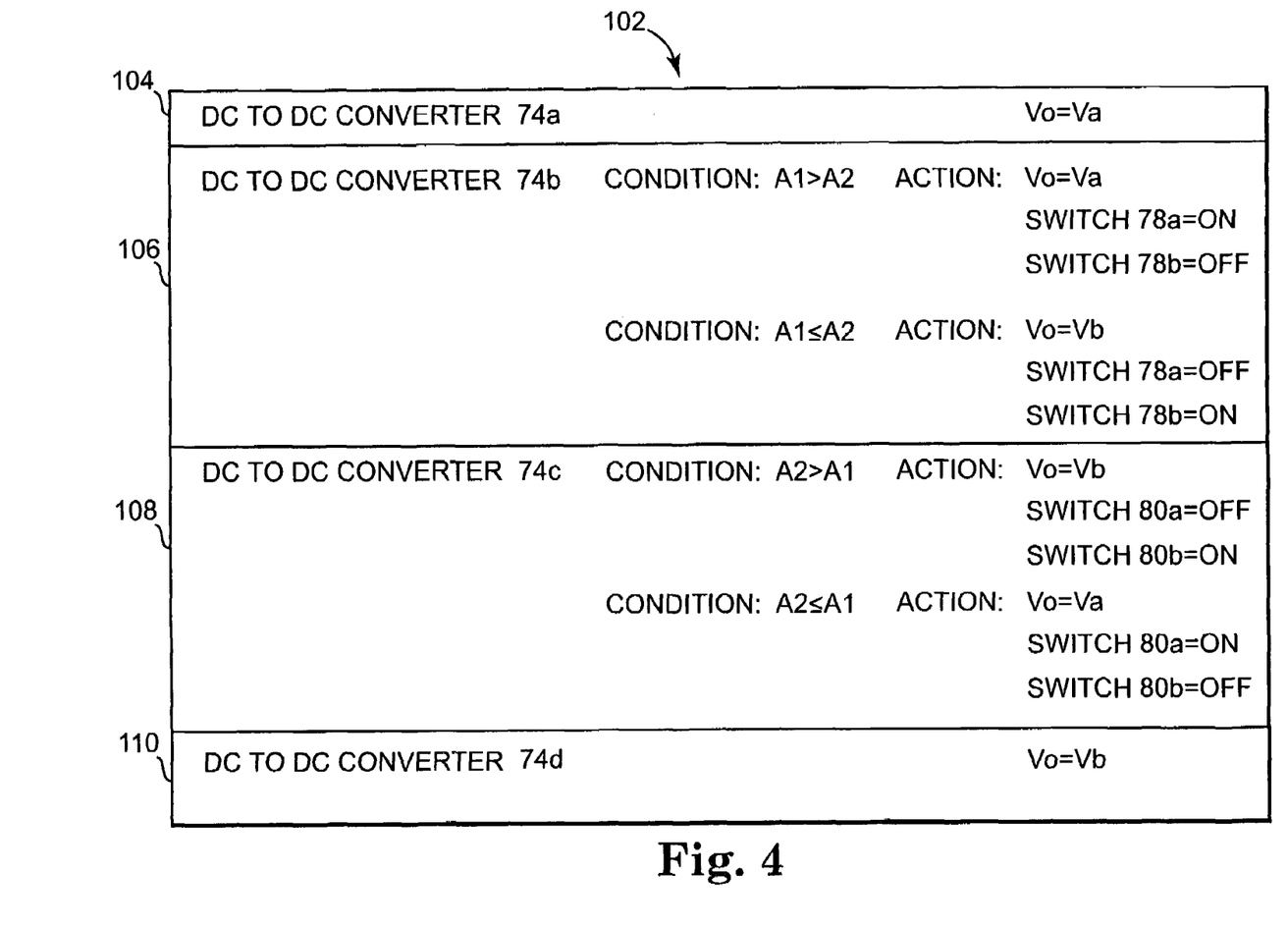
FIG. 4 is a diagram illustrating one embodiment of switching rules for the power management system illustrated in FIG. 3.

FIG. 4 is a diagram illustrating one embodiment of switching rules for the power management system 70 illustrated in FIG. 3. The switching rules are illustrated at 102. Conditions and actions to be taken for DC to DC converters 74a-74d are illustrated, respectively, at 104, 106, 108 and 110. In other embodiments, any suitable number of DC to DC converters 74 can be used to provide any suitable number of output voltages.

In the illustrated embodiment, DC to DC converter 74b includes a controller 12a and DC to DC converter 74c includes a controller 12b. Controller 12a compares variables A1 and A2, and controller 12b compares variables A1 and A2. Variables A1 and A2 represent, respectively, currents conducted by voltage rails 82 and 84. In one embodiment, variable A1 represents the total power consumed by PCI cards inserted into PCI slots 88 which are coupled to voltage rail 82, and variable A2 represents the total power consumed by PCI cards inserted into slots 88 which are coupled to voltage rail 84. In one embodiment, variable A1 represents the total number of PCI cards inserted into PCI slots 88 which are coupled to voltage rail 82, and variable A2 represents the total number of PCI cards inserted into PCI slots 88 which are coupled to voltage rail 84. In other embodiments, variables A1 and A2 represent other suitable variables or attributes related to voltage rails 82 and 84, the PCI cards or PCI slots 88.

In one embodiment, variable A1 consists of any suitable number of multiple variables (e.g. A1-1, A1-2, A1-3 . . . ) and variable A2 consists of any suitable number of multiple variables (e.g. A2-1, A2-2, A2-3 . . . ). In these embodiments, controller 12a or 12b compares A1-1, A1-2 and A1-3 to variables A2-1, A2-2 and A2-3 and completes an action which is dependent on a result of the comparison. In one embodiment, A1-1, A1-2 and A1-3 represent current or power used by corresponding PCI cards inserted in PCI slots 88 which are coupled to voltage rail 82, and A2-1, A2-2 and A2-3 represent current or power used by corresponding PCI cards inserted in PCI slots 88 which are coupled to voltage rail 84. In other embodiments, multiple variables A1 and multiple variables A2 can be other suitable variables or attributes related to voltage rails 82 and 84, the PCI cards or the PCI slots 88.

In the illustrated embodiment, the voltage output Vo provided by DC to DC converter 74a is equal to Va as illustrated at 104. The output voltage Vo provided by DC to DC converter 74d is equal to Vb as illustrated at 110. In this embodiment, Va is equal to 3.3 volts and Vb is equal to 5.0 volts. Controller 12a within DC to DC converter 74b compares variable A1 to A2 as illustrated at 106. In this embodiment, variable A1 is a value of current Ia conducted by voltage rail 82 and is the total current sourced by PCI cards inserted into PCI slots 88 which are coupled to voltage rail 82. Variable A2 is a value of current Ib conducted by voltage rail 84 and is the total current sourced by PCI cards inserted into PCI slots 88 which are coupled to voltage rail 84.

Controller 12a completes an action which is dependent on a result of the comparison. As illustrated at 106, if variable A1 is greater than A2, controller 12a enables DC to DC converter 74b to provide an output voltage Vo which is equal to Va, and activates or turns on switch 78a and ensures that switch 78b is turned off in order to couple the output voltage Va to voltage rail 82. Once this action is complete, DC to DC converter 74b is providing additional power capacity at voltage Va to voltage rail 82. If variable A1 is equal to or less than A2, controller 12a enables DC to DC converter 74b to provide an output voltage Vo which is equal to Vb, and activates or turns on switch 78b and ensures that switch 78a is turned off in order to couple the output voltage Vb to voltage rail 84. Once this action is complete, DC to DC converter 74b is providing additional power capacity at voltage Vb to voltage rail 84. By completing the action at 106, DC to DC converter 74b has allocated additional power capacity to the voltage rail 82 or 84 which is sourcing the greatest amount of current through PCI cards inserted in PCI slots 88 which are coupled to the voltage rails 82 or 84.

As illustrated at 108, if variable A2 is greater than A1, controller 12b enables DC to DC converter 74c to provide an output voltage Vo which is equal to Vb, and activates or turns on switch 80b and ensures that switch 80a is turned off in order to couple the output voltage Vb to voltage rail 84. Once this action is complete, DC to DC converter 74c is providing additional power capacity at voltage Vb to voltage rail 84. If variable A2 is equal to or less than A1, controller 12b enables DC to DC converter 74c to provide an output voltage Vo which is equal to Va, and activates or turns on switch 80a and ensures that switch 80b is turned off in order to couple the output voltage Va to voltage rail 82. Once this action is complete, DC to DC converter 74c is providing additional power capacity at voltage Va to voltage rail 82. By completing the action at 108, DC to DC converter 74c has allocated power capacity to the voltage rail 82 or 84 which is sourcing the greatest amount of current through PCI cards inserted in PCI slots 88 which are coupled to the voltage rails 82 or 84. Although two DC to DC converters 74b and 74c are illustrated as allocating power capacity according to a result of a comparison of variables A1 and A2, in other embodiments, any suitable number of DC to DC converters 74 can be used to compare any suitable number of variables A.

In the illustrated embodiment, DC to DC converters 74b and 74c do not provide the voltages Va or Vb to voltage rails 82 or 84 at the same time. Before controller 12a activates or turns on switch 78a or switch 78b, controller 12a verifies that status circuit 92 is in the first state which means that controller 12b is not activating or turning on switch 80a or switch 80b. If status circuit 92 is in the first state, controller 12a switches status circuit 92 into the second state before activating or turning on switch 78a or switch 78b, and switches status circuit 92 back into the first state after activating or turning on switch 78a or switch 78b.

Before controller 12b activates or turns on switch 80a or switch 80b, controller 12b verifies that status circuit 92 is in the first state which means that controller 12a is not activating or turning on switch 78a or switch 78b. If status circuit 92 is in the first state, controller 12b switches status circuit 92 into the second state before activating or turning on switch 80a or switch 80b, and switches status circuit 92 back into the first state after activating or turning on switch 80a or switch 80b. In other embodiments, any suitable number of DC to DC converters can be used, and when status circuit 92 is in the first state, none of the DC to DC converters are activating or turning on switches which couple their respective output voltages Vo to any of a suitable number of voltage rails.

Although specific embodiments have been illustrated and described herein, it will be appreciated by those of ordinary skill in the art that a variety of alternate and/or equivalent implementations may be substituted for the specific embodiments shown and described without departing from the scope of the invention. This application is intended to cover any adaptations or variations of the specific embodiments discussed herein. Therefore, it is intended that this invention be limited only by the claims and the equivalents thereof.

What is claimed is:

1. A power management system, comprising:
   a voltage source configured to provide at least a first voltage and a second voltage; and
   a controller configured to couple a selected one of the first voltage to a first voltage supply terminal and the second voltage to a second voltage supply terminal in response to a comparison of one or more first variables associated with the first voltage supply terminal to one or more second variables associated with the second voltage supply terminal wherein the selected one of the one or more first variables is selected from a group consisting of a first current conducted by the first voltage supply terminal and a first power amount consumed by first loads coupled to the first voltage supply terminal and the selected one of the one or more second variables is selected from a group consisting of a second current conducted by the second voltage supply terminal and power amount consumed by second loads coupled to the second voltage supply terminal.

2. The power management system of claim 1, wherein the controller couples the first voltage to the first voltage supply terminal if a selected one of the one or more first variables is greater than a selected one of the one or more second variables, and wherein the controller couples the second voltage to the second voltage supply terminal if the selected one of the one or more second variables is greater than the selected one of the one or more first variables.

3. The power management system of claim 2, wherein the selected one of the one or more first variables is a first current conducted by the first voltage supply terminal and the selected one of the one or more second variables is a second current conducted by the second voltage supply terminal.

4. The power management system of claim 2, wherein the selected one of the one or more first variables is a first power amount consumed by first loads coupled to the first voltage supply terminal and the selected one of the one or more second variables is a second power amount consumed by second loads coupled to the second voltage supply terminal.

5. The power management system of claim 1, wherein the power management system is compliant with a peripheral component interface (PCI) bus system specification.

6. The power management system of claim 1, wherein the voltage source comprises a first DC to DC converter and a second DC to DC converter, and wherein the first DC to DC converter provides the first voltage and the second DC to DC converter provides the second voltage.

7. The power management system of claim 1, wherein the voltage source compromises a DC to DC converter configured to provide a selected one of the first voltage and the second voltage.

8. The power management system of claim 7, wherein the DC to DC converter is a buck converter responsive to a switching duty cycle, wherein the controller is configured to provide a selected one of a first switching duty cycle and a second switching duty cycle signal to the buck converter which enables the buck converter to provide the selected one of the first voltage and the second voltage.

9. The power management system of claim 1, wherein the voltage source is configured to provide a third voltage, and wherein the controller is configured to couple the third voltage to a third voltage supply terminal in response to a comparison of one or more third variables to the one or more first variables and the one or more second variables.

10. The power management system of claim 9, wherein the controller couples the first voltage to the first voltage supply terminal if a selected one of the one or more first variables is greater than a selected one of the one or more second variables and a selected one of the one or more third variables, wherein the controller couples the second voltage to the second voltage supply terminal if the selected one of the one or more second variables is greater than the selected one of the one or more first variables and the selected one of the one or more third variables, and wherein the controller couples the third voltage to the third voltage supply terminal if the selected one of the one or more third variables is greater than the selected one of the one or more first variables and the selected one of the one or more second variables.

11. The power management system of claim 10, wherein the selected one of the one or more first variables is a first current conducted by the first voltage supply terminal, wherein the selected one of the one or more second variables is a second current conducted by the second voltage supply terminal, and wherein the selected one of the one or more third variables is a third current conducted by the third voltage supply terminal.

12. The power management system of claim 10, wherein the selected one of the one or more first variables is a first power amount consumed by first loads coupled to the first voltage supply terminal, wherein the selected one of the one or more second variables is a second power amount consumed by second loads coupled to the second voltage supply terminal, and wherein the selected one of the one or more third variables is a third power amount consumed by third loads coupled to the third voltage supply terminal.

13. The power management system of claim 1, wherein the controller comprises:
   one or more data storage locations configured to store one or more of the first variables and one or more of the second variables, wherein the controller is configured to monitor the one or more of the first variables and the one or more of the second variables and couple the selected one of the first voltage to the first voltage supply terminal and the second voltage to the second voltage supply terminal in response to a comparison of the one or more of the first variables to the one or more of the second variables.

14. The power management system of claim 1, wherein the voltage source comprises:
   an output terminal, wherein the voltage source is configured to provide a selected one of the first voltage or the second voltage to the output terminal;
   a first switch coupled between the output terminal and the first voltage supply terminal; and
   a second switch coupled between the output terminal and the second voltage supply terminal, wherein the controller is configured to couple the first voltage to the first voltage supply terminal by activating the first switch and deactivating the second switch, and wherein the controller is configured to couple the second voltage to the second voltage supply terminal by activating the second switch and deactivating the first switch.

15. The power management system of claim 1, wherein the controller includes a computer readable program code, and wherein the computer readable program code comprises:
- a first computer readable program code configured to cause the controller to compare the one or more first variables to the one or more second variables; and
- a second computer readable program code configured to cause the controller to couple the selected one of the first voltage to the first voltage supply terminal and the second voltage to the second voltage supply terminal in response to the comparison of the one or more first variables to the one or more second variables.

16. The power management system of claim 1 wherein the voltage source comprises an AC to DC converter configured to provide at least one of the first voltage and the second voltage.

17. A voltage distribution system, comprising:
- voltage converters, wherein each voltage converter is configured to provide one or more voltage levels, wherein each of the voltage converters is configured to couple a selected one of the one or more voltage levels to a corresponding voltage supply terminal in response to a comparison of a variable associated with the corresponding voltage supply terminal to variables associated with other corresponding voltage supply terminals, wherein the variables are selected from a group consisting of currents conducted by each of the corresponding voltage supply terminals and power amounts consumed by loads coupled to each of the corresponding voltage supply terminals.

18. The voltage distribution system of claim 17, wherein the variables are compared in an order, and wherein the selected one of the one or more voltage levels is coupled to the corresponding voltage supply terminal if the variable associated with the corresponding voltage supply terminal is greater than the variables associated with lower ordered voltage supply terminals and greater than the variables associated with higher ordered voltage supply terminals.

19. The voltage distribution system of claim 18, wherein the variables are currents conducted by each of the corresponding voltage supply terminals.

20. The voltage distribution system of claim 18, wherein the variables are power amounts consumed by loads coupled to each of the corresponding voltage supply terminals.

21. The voltage distribution system of claim 17 wherein the voltage converters comprise DC to DC converters.

22. The voltage distribution system of claim 17 wherein the voltage converters comprise AC to DC converters.

23. A power management system for a computer system, comprising:
- a first DC to DC converter which provides a first voltage to a first voltage rail within the computer system;
- a second DC to DC converter which provides a second voltage to a second voltage rail within the computer system;
- a third DC to DC converter which is configured to provide a selected one of the first voltage to the first voltage rail and the second voltage to the second voltage rail; and
- a first controller configured to enable the third DC to DC converter to provide a selected one of the first voltage to the first voltage rail and the second voltage to the second voltage rail in response to a comparison of one or more first variables associated with the first voltage rail to one or more second variables associated with the second voltage rail, wherein the one or more first variables is selected from a group consisting of a first current conducted by the first voltage rail and a first average power dissipated by first loads which are coupled to the first voltage rail and the one or more second variables is selected from a group consisting of a second current conducted by the second voltage rail and a second average power dissipated by second loads which are coupled to the second voltage rail.

24. The power management system of claim 23, wherein the one or more first variables includes a first current conducted by the first voltage rail and the one or more second variables includes a second current conducted by the second voltage rail, and wherein the first controller enables the third DC to DC converter to couple the first voltage to the first voltage rail if the first current is greater than the second current, and wherein the first controller enables the third DC to DC converter to couple the second voltage to the second voltage rail if the second current is greater than the first current.

25. The power management system of claim 23, wherein the one or more first variables includes a first average power dissipated by first loads which are coupled to the first voltage rail and the one or more second variables includes a second average power dissipated by second loads which are coupled to the second voltage rail, and wherein the first controller enables the third DC to DC converter to couple the first voltage to the first voltage rail if the first average power is greater than the second average power, and wherein the first controller enables the third DC to DC converter to couple the second voltage to the second voltage rail if the second average power is greater than the first average power.

26. The power management system of claim 23, wherein the one or more first variables includes a number of first printed circuit boards which are coupled to the first voltage rail and the one or more second variables includes a number of second printed circuit boards which are coupled to the second voltage rail, and wherein the first controller enables the third DC to DC converter to couple the first voltage to the first voltage rail if the number of first printed circuit boards is greater than the number of second printed circuit boards, and wherein the first controller enables the third DC to DC converter to couple the second voltage to the second voltage rail if the number of second printed circuit boards is greater than the number of first printed circuit boards.

27. The power management system of claim 23, wherein the third DC to DC converter is a buck converter responsive to a switching duty cycle, wherein the first controller enables the third DC to DC converter to provide the selected one of the first voltage and the second voltage by providing a selected one of a first switching duty cycle signal and a second switching duty cycle signal to the buck converter.

28. The power management system of claim 23, wherein the third DC to DC converter comprises:
- an output terminal, wherein the third DC to DC converter is configured to provide a selected one of the first voltage and the second voltage to the output terminal;
- a first switch coupled between the output terminal and the first voltage rail; and
- a second switch coupled between the output terminal and the second voltage rail, wherein the first controller enables the third DC to DC converter to couple the first voltage to the first voltage rail by activating the first switch and deactivating the second switch, and wherein the first controller enables the third DC to DC converter to couple the second voltage to the second voltage rail by activating the second switch and deactivating the first switch.

29. The power management system of claim 28, comprising:
- a fourth DC to DC converter which is configured to provide a selected one of the first voltage to the first voltage rail and the second voltage to the second voltage rail; and
- a second controller configured to enable the fourth DC to DC converter to provide a selected one of the first voltage to the first voltage rail and the second voltage to the second voltage rail in response to a comparison of the one or more first variables associated with the first voltage rail to the one or more second variables associated with the second voltage rail.

30. The power management system of claim 29, comprising a status circuit having at least a first state and at least a second state, wherein the first controller switches the status circuit from the first state to the second state before providing the selected one of the first voltage to the first voltage rail and the second voltage to the second voltage rail and switches the status circuit back to the first state after providing the selected one of the first voltage to the first voltage rail and the second voltage to the second voltage rail, wherein the second controller switches the status circuit from the first state to the second state before providing the selected one of the first voltage to the first voltage rail and the second voltage to the second voltage rail and switches the status circuit back to the first state after providing the selected one of the first voltage to the first voltage rail and the second voltage to the second voltage rail, and wherein the first controller and the second controller each verify that the status circuit is in the first state before switching the status circuit to the second state.

31. A method of managing power in a computer system which includes a first voltage supply terminal and a second voltage supply terminal, the method comprising:
- providing a first voltage and a second voltage;
- comparing one or more first variables associated with the first voltage supply terminal to one or more second variables associated with the second voltage supply terminal wherein the selected one of the one or more first variables is selected from a group consisting of a first current conducted by the first voltage supply terminal and a first power amount consumed by first loads coupled to the first voltage supply terminal and the selected one of the one or more second variables is a selected from a group consisting of second current conducted by the second voltage supply terminal and a second power amount consumed by second loads coupled to the second voltage supply terminal; and
- coupling the first voltage to the first voltage supply terminal if a selected one of the one or more first variables is greater than a selected one of the one or more second variables and coupling the second voltage to the second voltage supply terminal if the selected one of the one or more second variables is greater than the selected one of the one or more first variables.

32. The method of claim 31, wherein, wherein the selected one of the one or more first variables is a first current conducted by the first voltage supply terminal and the selected one of the one or more second variables is a second current conducted by the second voltage supply terminal.

33. The method of claim 31, wherein the selected one of the one or more first variables is a first power amount consumed by first loads coupled to the first voltage supply terminal and the selected one of the one or more second variables is a second power amount consumed by second loads coupled to the second voltage supply terminal.

34. A method of distributing voltage levels to corresponding voltage supply terminals in a computer system, comprising:
- comparing a variable associated with one of the corresponding voltage supply terminals to variables associated with other corresponding voltage supply terminals;
- coupling one of the voltage levels to the corresponding voltage supply terminal if the variable associated with the corresponding voltage supply terminal is greater than the variables associated with lower ordered voltage supply terminals and greater than the variables associated with higher ordered voltage supply terminals wherein the variables are selected from a group consisting of currents conducted by each of the corresponding voltage supply terminals and power amounts consumed by loads coupled to each of the corresponding voltage supply terminals.

35. The method of claim 34, wherein the variables comprise currents conducted by each of the corresponding voltage supply terminals.

36. The method of claim 34, wherein the variables comprise power amounts consumed by loads coupled to each of the corresponding voltage supply terminals.

37. A power management system, comprising:
- means for providing a first voltage and a second voltage;
- means for comparing one or more first variables associated with the first voltage supply terminal to one or more second variables associated with the second voltage supply terminal;
- means for coupling the first voltage to a first voltage supply terminal if a selected one of the one or more first variables is greater than a selected one of the one or more second variables and coupling the second voltage to a second voltage supply terminal if the selected one of the one or more second variables is greater than the selected one of the one or more first variables wherein the selected one of the one or more first variables is selected from a group consisting of a first current conducted by the first voltage supply terminal and a first power amount consumed by first loads coupled to the first voltage supply terminal and the selected one of the one or more second variables is a selected from a group consisting of second current conducted by the second voltage supply terminal and a second power amount consumed by second loads coupled to the second voltage supply terminal.

38. A voltage distribution system, comprising:
means for providing one or more voltage levels; and
means for coupling one of the one or more voltage levels to a corresponding voltage supply terminal in response to a comparison of a variable associated with the corresponding voltage supply terminal to variables associated with other corresponding voltage supply terminals, wherein the variables are compared in an order, and wherein the one of the one or more voltage levels is coupled to the corresponding voltage supply terminal if the variable associated with the corresponding voltage supply terminal is greater than the variables associated with lower ordered voltage supply terminals and greater than the variables associated with higher ordered voltage supply terminals wherein the variables are selected from a group consisting of currents conducted by each of the corresponding voltage supply terminals and power amounts consumed by loads counted to each of the corresponding voltage supply terminals.

* * * * *

UNITED STATES PATENT AND TRADEMARK OFFICE
CERTIFICATE OF CORRECTION

| | |
|---|---|
| PATENT NO. | : 7,380,146 B2 |
| APPLICATION NO. | : 11/112120 |
| DATED | : May 27, 2008 |
| INVENTOR(S) | : John Malvern Swope |

It is certified that error appears in the above-identified patent and that said Letters Patent is hereby corrected as shown below:

In column 11, line 60, in Claim 7, delete "compromises" and insert -- comprises --, therefor.

In column 15, line 56, in Claim 32, after "31," delete "wherein,".

In column 16, line 64, in Claim 38, delete "counted" and insert -- coupled --, therefor.

Signed and Sealed this

Fifth Day of August, 2008

JON W. DUDAS
*Director of the United States Patent and Trademark Office*